United States Patent
Carnesi

[19]

[11] Patent Number: 5,819,607
[45] Date of Patent: Oct. 13, 1998

[54] ADJUSTABLE SOCKET

[76] Inventor: Thomas Carnesi, 1410 Brett Pl., #140, San Pedro, Calif. 90732-5076

[21] Appl. No.: 770,869

[22] Filed: Dec. 20, 1996

[51] Int. Cl.$^6$ .................................................. B25B 13/18
[52] U.S. Cl. .......................... 81/128; 81/DIG. 5; 279/114
[58] Field of Search ....................... 81/128, 129, DIG. 5, 81/66, 110, 111; 279/114

[56] References Cited

U.S. PATENT DOCUMENTS

| | | | |
|---|---|---|---|
| 51,384 | 12/1865 | Cushamn | 279/114 |
| 877,773 | 1/1908 | Holm | 81/128 |
| 1,288,154 | 12/1918 | Palmgren . | |
| 1,425,213 | 8/1922 | Palmgren . | |
| 1,503,635 | 8/1924 | Butler | 279/114 |
| 2,664,213 | 5/1953 | Anati | 81/128 |
| 2,742,297 | 4/1956 | Bilz | 279/66 |
| 2,778,260 | 1/1957 | Jovanovich | 81/DIG. 5 |
| 2,884,826 | 5/1959 | Bruhn | 81/128 |
| 3,209,624 | 10/1965 | Shiffman | 81/128 |
| 3,724,299 | 4/1973 | Nelson | 81/128 |
| 4,663,999 | 5/1987 | Colvin . | |
| 4,884,480 | 12/1989 | Briese | 81/128 |
| 4,892,016 | 1/1990 | Anderson . | |
| 5,207,129 | 5/1993 | Fossella | 81/128 |
| 5,337,634 | 8/1994 | Carnesi . | |
| 5,540,124 | 7/1996 | Srhoj . | |

*Primary Examiner*—David A. Scherbel
*Assistant Examiner*—Joni B. Danaganan
*Attorney, Agent, or Firm*—John J. Connors; Connors & Assoc.

[57] ABSTRACT

An adjustable socket includes a drive member, a plurality of jaw members supported by the drive member and selectively movable between fixed lateral positions, each fixed lateral position corresponding to a selected socket size, and a drive coupling operatively coupled to the drive member and manually movable to different positions corresponding to the selected socket size openings. The drive coupling has a substantially flat cam surface with spirally configured guide elements thereon that engage cam followers on the jaw members to move the jaw members laterally. There are a plurality indexing slots in the drive member and an indexing and locking element that selectively engages and locks into an indexing slot upon a socket size openings being selected. The number of indexing slots correspond to the number of selectable socket size openings available. There are visible indicia associated with each selectable position to indicate the selected socket size openings.

13 Claims, 4 Drawing Sheets

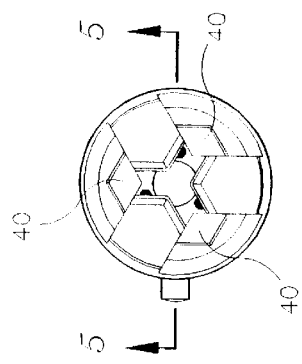
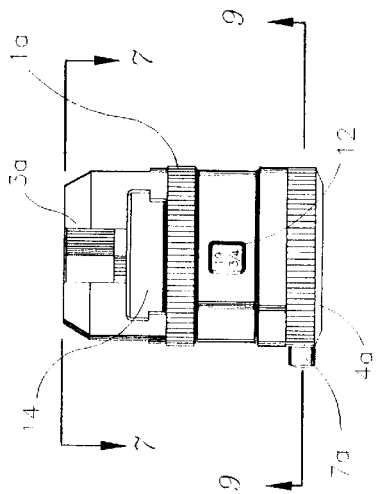
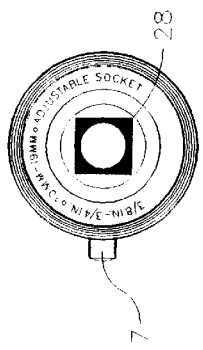
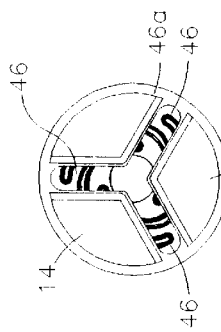
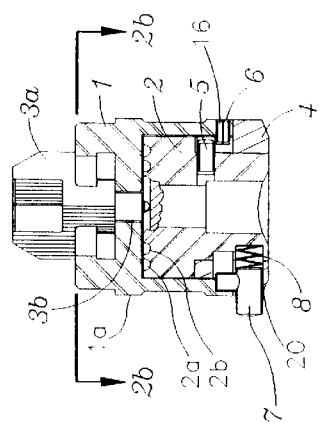
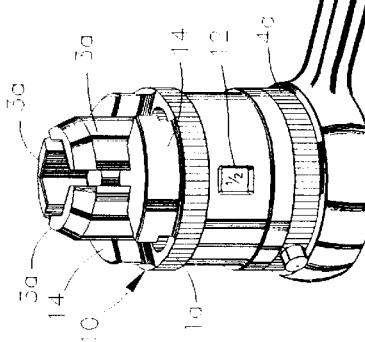

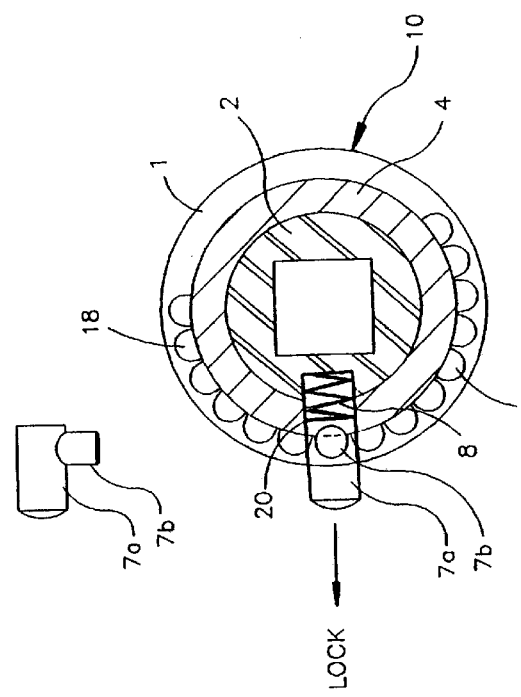
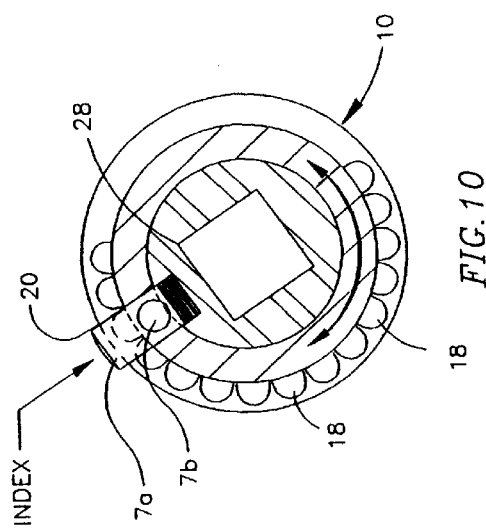

ADJUSTABLE SOCKET

BACKGROUND OF THE INVENTION

1. Field of the Invention

This invention relates to an adjustable socket which accepts hexagonal shaped heads of nuts and bolts having different head sizes.

2. Background Discussion

In U.S. Pat. No. 5,337,634, there is disclosed a socket which is manually adjustable to enable the socket to grip nuts or bolts with hexagonal heads of different sizes. In this socket there is a plurality of jaws which are adjustably spaced apart to grip a hexagonal head of a selected size. Although this socket allows a user to make the necessary adjustments, it includes a great number of parts which add to its cost of manufacturing. Because of the cam configuration and number of parts employed in the socket disclosed in U.S. Pat. No. 5,337,634, typically its length is about 2 inches. This can be a disadvantage when attempting to loosen or tighten a nut or bolt that is to be fitted into a small space.

SUMMARY OF THE INVENTION

It is the object of the invention to provide a socket with a minimum number of parts that has a size range adjustment for use with different sized hexagonal shaped nuts and bolts, with the adjustment not increasing the effective length of the socket.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include convenience of use, minimum number of parts for low cost manufacture, compactness for fitting into tight spaces, improved strength, and lateral adjustment of the gripping jaws so that the effective length of the socket remains constant.

The first feature of the adjustable socket of this invention is that it includes a drive member and a plurality of jaw members supported by the drive member. Preferably, the drive member has a cylindrical configuration, hollow interior and an end wall. There is a plurality of elongated, radial openings in the end wall of the drive member, and a portion of each of the jaw members extends through each radial opening. The jaws are moveable reciprocally along the radial openings, but are connected to the drive member so that they do not move lengthwise along the socket. The jaw members are selectively movable between fixed, precise lateral positions. Each fixed lateral position corresponds to a selected socket size. The portion of each jaw member extending through a radial opening terminates in a cam follower. In the preferred embodiment, there is a window in the side wall of the cylindrical drive member by which pass visible indicia associated with each selectable position. The indicia typically are numbers corresponding to the size of the hexagonal head to be gripped by the jaw members.

The second feature is that a drive coupling is operatively coupled to the drive member and manually movable to different positions corresponding to the selected socket size openings. The drive coupling has a substantially flat cam surface with guide elements that engage the cam followers on the jaw members. The flat cam surface is positioned adjacent to the underside of the end wall of the drive member substantially at a right angle to the longitudinal axis of the drive member, so that the cam followers may ride along the guide elements. The guide elements are configured to move the jaw members simultaneously and laterally upon the relative rotation of the drive member and drive coupling. Preferably, the guide elements are arranged in a spiral configuration, and preferably, these guide elements are slots in the flat cam surface.

The third feature is that there is a plurality of indexing slots in the drive member on its interior and an indexing and locking element that selectively engages and locks into an indexing slot upon a socket size opening being selected. The number of indexing slots corresponds to the number of selectable socket size openings available. Upon disengaging the indexing and locking element from a slot and rotating the drive member and drive coupling relative to each other, the jaw members are moved between fixed lateral positions. Each fixed lateral position corresponds to a selected socket size.

The fourth feature of this invention is its length. Because of the use of the flat cam surface at a right angle to the longitudinal axis of the drive member, the overall length of the socket may be minimized, so that the socket can fit into small spaces. In the preferred embodiment, the socket's length does not exceed 1.75 inches, and typically ranges between about 1.5 and about 1.75 inches.

BRIEF DESCRIPTION OF THE DRAWING

The preferred embodiment of this invention, illustrating all its features, will now be discussed in detail. This embodiment depicts the novel and non-obvious socket of this invention as shown in the accompanying drawing, which is for illustrative purposes only. This drawing includes the following figures (FIGS.), with like numerals indicating like parts:

FIG. 1 is a side view of the adjustable socket of the present invention.

FIG. 2a is the top plan view of the adjustable socket of the present invention showing a three jaw configuration.

FIG. 2b is a cross sectional view taken along line 2b—2b of FIG. 5, with the jaws removed.

FIG. 3 is the bottom plan view of the adjustable socket of the present invention showing the ⅜ inch square drive coupling slot.

FIG. 4 is a perspective view of the adjustable socket of the present invention attached to a wrench for turning the socket.

FIG. 5 is a cross sectional view taken along line 5—5 of FIG. 2a.

FIG. 9 is a cross sectional view taken along line 9—9 of FIG. 1, illustrating a drive coupling in a locked position when a spring loaded index pin is released into one of the fifteen index notches on the drive cylinder.

FIG. 10 a cross sectional view similar to that of FIG. 9, illustrating the drive coupling in a neutral index mode when the spring loaded pin is compressed inward and out from one of the index notches.

FIG. 11 is a side elevational view of the index and locking button.

DETAILED DESCRIPTION OF THE PREFERRED EMBODIMENT

Figure 6:
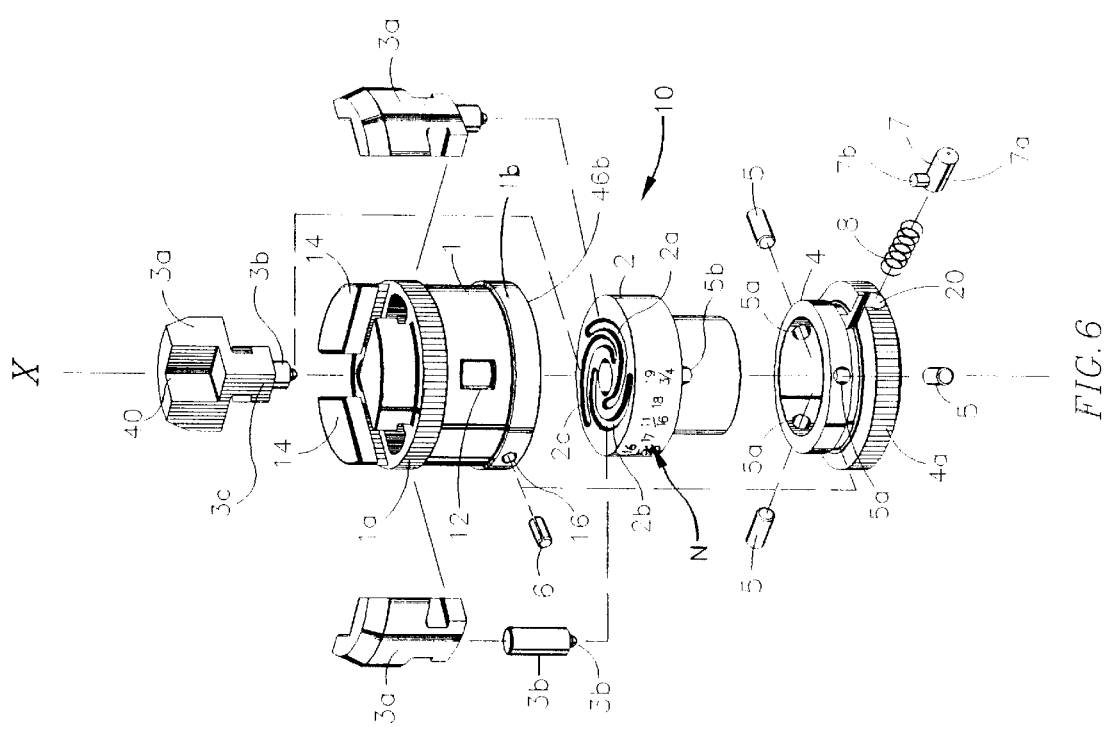
FIG. 6 is an exploded perspective view of the adjustable socket of the present invention illustrating all of the socket components.

As best shown in FIGS. 1 through 6, the adjustable socket 10 of this invention includes a hollow drive cylinder 1, three gripping jaws 3a carried by the drive cylinder, a drive coupling 2 having a flat cam surface 2a with spirally arranged slots 2c, 2d, and 2e therein that receive the nipple ends 3b' of followers 3b extending outward from the stems 3c of the gripping jaws, and an indexing collar 4. The drive cylinder 1, drive coupling 2, and indexing collar 4 are connected together so that they all are axially aligned along the longitudinal axis X (FIG. 6) of the socket 10, and the gripping jaws are radially displaced from the longitudinal axis X. The distance from the longitudinal axis X of these gripping jaws 3a is varied depending on the size of the hexagonal head of the nut or bolt being grasped by the socket 10. The exterior surface of the rim 4a of the indexing collar 4 is knurled to improve gripping.

The drive cylinder 1 has three spaced-apart, wedged shaped fingers 14 at its upper end, with one jaw 3a being positioned between adjacent fingers, a rectangular window 12 near its base 1b, a knurled upper rim 1a, and a hole 16 near the lower end of the cylinder which receives a spring pin 6 that connects the drive cylinder 1 and drive coupling 2. Above the rim 4a of the collar 4 is a 3/32 inch wide groove 4b which receives the end of the spring pin 6 extending through the hole 16. The spring pin 6 prevents the cylinder 1 from sliding axially relative to the collar and coupling assembly. The central section of the drive cylinder 1 is bored out to provide, opposed an end wall 46a, an open end 46b which receives the drive coupling 2. The drive coupling 2 has three 1/8 inch diameter holes aligned with three 1/8 inch diameter holes in the indexing collar 4. The drive coupling 2 and the indexing collar 4 are coupled together as a unit by three 1/8 inch diameter by 1/4 inch length dowel pins 5 which pass through holes 5a in the indexing collar and into holes 5b in the drive coupling.

The drive coupling 2 has on the upper exterior of its side a series of numbers N in a row which correspond to the different size hexagonal heads of the nuts and bolts the socket 10 is designed to grip. Upon rotating the indexing collar 4, the drive coupling 2 rotates with the collar to move sequentially the series of numbers N past the window 12. The number appearing in the window 12 indicates to the user that the jaws 3a are positioned to grasp a hexagonal head of the same size appearing in the window. For example, if the number 3/4 appears in the window, the jaws 3a are positioned to grasps a hexagonal head having a diameter of 3/4 of an inch. The setting of the jaws 3a are such that hexagonal heads sized in both English and Metric units may be grasped by the socket 10. For example, the socket may accommodate head sizes ranging between 3/8 to 3/4 inch and 10 millimeters to 19 millimeters. The numbers N appear as graduations etched in sequential order as follows: 3/8 inch, 10 mm, 11 mm, 7/16 inch, 12 mm, 13 mm, 1/2 inch, 14 mm, 9/16 inch, 15 mm, 16 mm, 5/8 inch, 17 mm, 11/16 inch, 18 mm, 19 mm, and 3/4 inch. Because both the 11 mm and 7/16 inch and the 19 mm and 3/4 inch sizes are virtually the same, they are incorporated into one size setting. These noted sizes are visible through a rectangular slotted window 12 upon rotating the indexing collar 4.

The cylinder 1 has, for example, fifteen (15) equally spaced indexing slots 18 (FIGS. 9 and 10) which are along the inside the diameter of the cylinder 1 near its base 1b. Each slot 18 represents one of the adjustable sizes which the socket 10 can be manually adjusted to accommodate. An L-shaped index button 7 including an arm 7a and rod 7b is used along with the indexing collar 4 to select the position of the jaws 3a to grasp the selected size head. The arm 7a is seated within a groove 20 on the indexing collar 4, and the rod is seated in one of the slots 18. The end of the arm 7a protrudes from the index collar 4. As best shown in FIGS. 9 and 10, when the end of the arm 7a is manually pushed inward towards the longitudinal axis X, this causes the rod 7b to disengage from the slot 18 it was in, placing both the drive coupling 2 and indexing collar 4 into a neutral-indexing position. The neutral position permits the user while holding the cylinder 1, to rotate, either clockwise or counter-clockwise, the drive coupling 2 and indexing collar 4 simultaneously to select a new jaw position. When the user releases the index button 7, an index button return spring 8 seated in the groove 20 between the end of the arm 7a and the inside end of the slot 20 pushes the index button outward. When this occurs, the rod 7b of the index button 7 is now aligned with another slot 18 corresponding to a newly selected jaw size as seen through the window 12. The rod 7b is now pushed by the return spring 8 into the index slot opposite the rod, thus locking both the indexing collar 4 and drive coupling 2 to the cylinder 1 as a unit, preventing the jaws 3a from drifting outward during use. The rod 7b is sufficiently strong so that it can withstand the torque applied to the socket 10 when used to turn an hexagonal head of nut or bolt.

As best shown in FIG. 2a, each of the three jaws 3a of the socket 10 have a 120° inward notch 40. These three notches 40 with the jaws 3a concentrically arranged around the longitudinal axis X assume a configuration for grasping an hexagonal shaped head of a nut or bolt. The stem 3c of the jaw 3a has a T-shape so that each the stem fits precisely into a T-shaped channel formed by cut-a-way sections in adjacent wedged shaped fingers 14 just above the knurled upper rim 1a. Such connection of the jaws 3a to the drive cylinder 1 prevent their movement lengthwise parallel to the axis X. A small hole (not shown) is drilled along the bottom and center of each stem 3c to accept a slip fit 3/16 diameter cam follower 3b. As best shown in FIG. 2b, each of the three cam followers 3b extend 5/32 of an inch downward and through one of the three 120 degree equal spaced radial, elongated openings 46 in a top wall 46a of the cylinder 1. In accordance with this invention, the nipple ends 3b' of each cam follower 3b rides within each of the three equaled spaced, curved slots 2c, 2d, and 2e of the cam surface 2a. The curvature and spatial arrangement of the slots 2c, 2d, and 2e corresponds to a geometric configuration adapted to control the lateral movement and position of the three (3) jaw members to correspond with the numbers N. The number of slots equals the number of jaws 3a. Upon assembly of the drive cylinder 1, drive coupling 2, and indexing collar 4, the cam surface 2a is adjacent the underside of the top wall 46a of the cylinder and each nipple end 3b' of each cam follower 3b engages different slot slots 2c, 2d, and 2e. The stems 3c move reciprocally along the radial openings 46 as the distances between the jaws 3a are increased or decreased. Using the three stems 3c improves the strength of the socket 10, so that the socket can withstand high torque forces.

Figure 7:
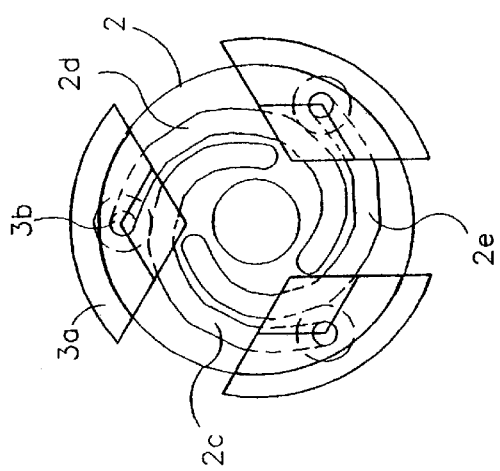
FIG. 7 is cross sectional view taken along line 7—7 of FIG. 1, illustrating the three jaw members and their attached follower pins riding on the tracks of a cam disk when rotated at maximum (¾ inch) opening.
Figure 8:
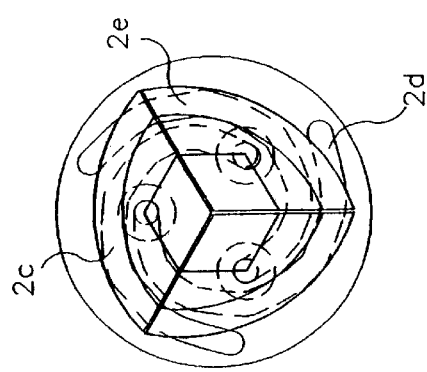
FIG. 8 a cross sectional view similar to FIG. 7 illustrating the three jaw members and their attached follower pins when the cam disk is rotated in the to provide the minimum (⅜ inch) jaw opening.

As best seen in FIGS. 7 and 8, when the user holds with one hand the drive cylinder 1 by it's upper knurled rim 1a, and rotates with the other hand the index collar 4, simultaneously depressing the index button 7, rotation in a clockwise direction increases the size of the jaws opening, and rotation in a counter-clockwise direction decreases the opening size. The jaws 3a are thus set at the desired spacing. The socket is then connected to a wrench 30. As depicted in FIGS. 3 and 4, there is along the axis X a ⅜ inch square opening 28 into which a universal ⅜ inch square driver (not shown) of the wrench 30 fits to turn the socket 10.

In summary, the cylindrical shaped adjustable socket 10 wrenches hexagonal shaped heads of bolts and nuts, having a plurality discrete sizes in both English and Metric units. The preferred embodiment has three jaws 3a equally spaced and radially positioned to move laterally. The jaws 3a ride within T-shaped channels on the upper portion of the socket 10. Each of the jaws 3a are notched to assume different sized hexagonal configurations to accommodate different hexagonal shaped heads of various sizes. The socket's overall length is about 1¾ inches and remains the same at every adjusted size, because of the lateral adjustment of the jaws 3a provided by the nipple ends 3b' of the cam followers 3b interacting with the spirally arranged slots 2c, 2d, and 2e in the cam surface 2a. Because the cam surface 2a is at right angle to the axis X and parallel to the end wall 46a, the direction of movement or adjustment of the jaws 3a is lateral, i. e., parallel to the cam surface 2a. This lateral adjustment of the jaws 3a overcomes the disadvantage of other sockets which are similar to that of a drill chuck where clamping members or jaws become progressively longer when adjusting down to smaller sizes. Extending lengthwise the clamping members or jaws can be a handicap when working in tight spaces. Such a handicap is avoided with the present invention.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. An adjustable socket with a number of selectable socket size openings available, including
    a drive member having a longitudinal axis and an internal wall with a plurality of indexing slots therein arranged in a row, each slot representing one socket size,
    a plurality of jaw members supported by the drive member and selectively movable between fixed lateral positions, each fixed lateral position corresponding to a selected socket size,
    a drive coupling operatively coupled to the drive member and manually movable to different positions corresponding to the selected socket size openings,
    said drive coupling having a cam surface with guide elements that engage cam followers on the jaw members to move the jaw members laterally, said cam surface being substantially at a right angle to the longitudinal axis, and
    an indexing element carried by the drive coupling that selectively engages and locks into an indexing slot upon a socket size openings being selected.

2. The adjustable socket of claim 1 where there are visible indicia associated with each selectable position to indicate the selected socket size openings.

3. The adjustable socket of claim 1 where the guide elements are arranged in a spiral configuration.

4. The adjustable socket of claim 1 where the cam surface is substantially flat and the guide elements are slots in the flat cam surface.

5. The adjustable socket of claim 1 where the number of indexing slots correspond to the number of selectable socket size openings.

6. An adjustable socket with a number of selectable socket size openings available, including
    a cylindrical drive member having a longitudinal axis and a hollow interior, a plurality of elongated, radial openings in an end wall of the drive member, and a side wall with an internal surface with a plurality of indexing slots therein arranged in a row, each slot representing one socket size,
    a plurality of jaw members supported by the drive member, a portion of each jaw member having a cam follower extending through each of said radial openings and moveable reciprocally along said radial openings,
    a cylindrical drive coupling which is received in the hollow interior of the drive member, said drive member and drive coupling being operatively coupled together to be rotated relative to each other,
    said drive coupling having a substantially flat cam surface which is positioned adjacent an underside of the end wall of the drive member substantially at a right angle to the longitudinal axis, said cam surface having guide elements that engage the cam followers on the jaw members, said guide elements configured to move the jaw members laterally upon the relative rotation of the drive member and drive coupling,
    an indexing locking element carried by the drive coupling which locks into an indexing slot of the drive member to lock the drive member and drive coupling together in a selected position upon a socket size openings being selected until disengaged to allow the drive member and drive coupling to rotate relative to each other,
    said jaws being selectively movable between fixed lateral positions upon disengaging the locking element and rotating the drive member and drive coupling relative to each other, each fixed lateral position corresponding to a selected socket size.

7. The adjustable socket of claim 6 where there are visible indicia associated with each selectable position to indicate the selected socket size openings.

8. The adjustable socket of claim 6 where the guide elements are arranged in a spiral configuration.

9. The adjustable socket of claim 6 where the guide elements are slots in the flat cam surface.

10. An adjustable socket with a number of selectable socket size openings available, including
    a cylindrical drive member having a longitudinal axis and a hollow interior, a plurality of elongated, radial openings in an end wall of the drive member, and a cylindrical side wall with an internal cylindrical surface with a plurality of indexing slots therein arranged in a row near an edge which is opposite the end wall, each slot representing one socket size,
    a plurality of jaw members supported by the drive member, a portion of each jaw member having a cam follower extending through each of said radial openings and moveable reciprocally along said radial openings, a cylindrical drive coupling which is received in the hollow interior of the drive member, said drive member and drive coupling being operatively coupled together to be rotated relative to each other, said drive coupling having a substantially flat cam surface which is positioned adjacent an underside of the end wall of the drive member substantially at a right angle to the longitudinal axis, said cam surface having guide elements arranged in a spiral configuration that engage the cam followers on the jaw members and move the jaw members laterally upon the relative rotation of the drive member and drive coupling, an indexing locking element carried by the drive coupling that selectively engages and locks into an indexing slot upon a socket size openings being selected, said indexing locking element locking the drive member and drive coupling together in the selected position until disengaged to allow the drive member and drive coupling to rotate relative to each other, said the locking element including a manually operable substantially L-shaped indexing element that is spring biased by a spring member seated between an end of the L-shaped indexing element and a wall of the drive coupling, said L-shaped indexing element selectively engaging and locking into an indexing slot upon a socket size openings being selected, the number of indexing slots corresponding to the number of selectable socket size openings available, and said jaws being selectively movable between fixed lateral positions upon disengaging the locking element and rotating the drive member and drive coupling relative to each other, each fixed lateral position corresponding to a selected socket size with visible indicia associated with each selectable position to indicate the selected socket size openings.

11. The adjustable socket of claim 10 where the guide elements are slots in the flat cam surface.

12. The adjustable socket of claim 11 where the overall length of the socket does not exceed 1.75 inches.

13. The adjustable socket of claim 10 where the overall length of the socket is between 1.5 and 1.75 inches.

* * * * *